US011155157B2

(12) United States Patent
Nistler et al.

(10) Patent No.: US 11,155,157 B2
(45) Date of Patent: Oct. 26, 2021

(54) LOCKING SYSTEM FOR A FUEL COMPARTMENT ASSEMBLY OF A WORK VEHICLE

(71) Applicant: CNH Industrial America LLC, New Holland, PA (US)

(72) Inventors: Jonathan Nistler, Moorhead, MN (US); Evan Riskedahl, Bismarck, ND (US); Joshua Yurek, Silver Lake, MN (US)

(73) Assignee: CNH Industrial America LLC

( * ) Notice: Subject to any disclaimer, the term of this patent is extended or adjusted under 35 U.S.C. 154(b) by 396 days.

(21) Appl. No.: 16/363,777

(22) Filed: Mar. 25, 2019

(65) Prior Publication Data

US 2020/0307372 A1 Oct. 1, 2020

(51) Int. Cl.
*B60K 15/05* (2006.01)
*B60K 15/03* (2006.01)
*E05B 83/28* (2014.01)

(52) U.S. Cl.
CPC .............. *B60K 15/03* (2013.01); *E05B 83/28* (2013.01); *B60K 2015/03375* (2013.01); *B60K 2015/03407* (2013.01); *B60K 2015/03434* (2013.01); *B60K 2015/0561* (2013.01); *B60Y 2200/22* (2013.01)

(58) Field of Classification Search
CPC .... B60K 2015/0561; B60K 2015/0569; B60K 2015/0576; B60K 2015/0584; B60K 15/04; B60K 15/05
USPC ............................................. 296/37.6, 97.22
See application file for complete search history.

(56) References Cited

U.S. PATENT DOCUMENTS

| | | | |
|---|---|---|---|
| 272,671 A | 2/1883 | England | |
| 3,503,648 A | 3/1970 | James | |
| 4,223,940 A | 9/1980 | Janz et al. | |
| 4,525,004 A * | 6/1985 | Tanaka | B60K 15/05 292/171 |
| 4,758,811 A * | 7/1988 | Slavin | B60K 15/05 335/230 |
| 5,123,691 A * | 6/1992 | Ginn | B60R 9/00 292/201 |
| 5,235,830 A * | 8/1993 | Benge | E05B 63/244 292/148 |
| 5,658,036 A * | 8/1997 | Benoist | B60K 15/05 296/97.22 |
| 6,270,099 B1 * | 8/2001 | Farkash | B60R 3/002 182/127 |

(Continued)

*Primary Examiner* — Jeffrey J Restifo
(74) *Attorney, Agent, or Firm* — Peter Zacharias; Patrick Sheldrake

(57) ABSTRACT

A locking system for a fuel compartment assembly of a work vehicle, the locking system having a housing at least partially defining a fuel access compartment, a door pivotally coupled to the housing and movable between an opened position, at which the door provides access to the fuel access compartment, and a closed position, at which the door blocks access to the fuel access compartment, and a locking assembly configured to lock the door at the closed position. The locking assembly includes a catch fixed to the housing and positioned within the fuel access compartment, and a latch arm pivotably coupled to the door at a pivot point defined between first and second ends of the latch arm, the pivot point defining a first pivot axis, where the latch arm is configured to be pivoted about the first pivot axis to be selectively engaged and disengaged with the catch.

20 Claims, 9 Drawing Sheets

(56) References Cited

U.S. PATENT DOCUMENTS

| | | | | |
|---|---|---|---|---|
| 6,406,045 B1* | 6/2002 | Farkash | ............... | B60R 3/002 |
| | | | | 280/164.1 |
| 6,564,602 B2 | 5/2003 | Gregory | | |
| 6,755,057 B2* | 6/2004 | Foltz | ............... | B60K 15/04 |
| | | | | 141/312 |
| 6,808,226 B2* | 10/2004 | Hirano | ............... | B60J 5/06 |
| | | | | 292/DIG. 46 |
| 6,994,392 B2* | 2/2006 | Seto | ............... | B60K 15/05 |
| | | | | 296/155 |
| 7,516,632 B2* | 4/2009 | Poppell | ............... | B60R 11/06 |
| | | | | 296/37.6 |
| 7,537,269 B2* | 5/2009 | Tseng | ............... | B60K 15/05 |
| | | | | 296/155 |
| 7,766,410 B2* | 8/2010 | Tseng | ............... | B60K 15/05 |
| | | | | 296/97.22 |
| 10,458,160 B2* | 10/2019 | Setaki | ............... | B60K 15/063 |
| 10,767,401 B2* | 9/2020 | Lee | ............... | E05B 17/0037 |
| 10,815,703 B2* | 10/2020 | Ciarmatori | ............... | E05B 81/66 |
| 2018/0245381 A1* | 8/2018 | Setaki | ............... | B60K 15/067 |

* cited by examiner

LOCKING SYSTEM FOR A FUEL COMPARTMENT ASSEMBLY OF A WORK VEHICLE

FIELD OF THE INVENTION

The present subject matter relates generally to work vehicles, and more particularly, to a locking system for use with a fuel compartment assembly of a work vehicle.

BACKGROUND OF THE INVENTION

Work vehicles, such as tractors and other agricultural vehicles, typically include a fuel access compartment for accessing filler necks for consumable fluid tanks, such as a diesel exhaust fluid (DEF) tank and/or a fuel tank. Due to the configuration of conventional work vehicles, the filler necks of the consumable fluid tanks are typically positioned adjacent to a wheel of the work vehicle. As such, the filler necks need to be protected from mud and debris flung from the wheel during operation of the work vehicle that could make it difficult to access the filler necks without potentially contaminating the consumable fluids within the supply tanks.

To address this issue, a door is typically provided to selectively cover the filler necks. For example, the door may be pivotably coupled to the fuel access compartment to allow the door to be moved between a closed position, in which the filler necks are protected from debris and not accessible to an operator, and an opened position, in which the filler necks are unprotected and accessible to an operator. Additionally, to prevent unauthorized access and/or to discourage tampering or theft of the consumable fluids contained within the tanks, fuel access doors are typically provided with a locking mechanism. However, conventional locking mechanisms for fuel access doors suffer from various drawbacks. For example, conventional locking mechanisms are typically positioned directly adjacent to one side of the door and are configured to simply engage an adjacent portion of the fuel access compartment across the interface defined immediately between such side of the door and the adjacent portion of the fuel access compartment. Such locking configurations are very susceptible to the door being pried open. Moreover, conventional locking mechanisms typically rely on the operator moving the mechanism to its locked position when closing the door. In this regard, if the locking mechanism is not moved fully back to its locked position, the door may incidentally open during operation.

Accordingly, an improved locking system for use with a fuel compartment assembly of a work vehicle that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a locking system for a fuel compartment assembly of a work vehicle. The locking system includes a housing at least partially defining a fuel access compartment, a door pivotally coupled to the housing and movable between an opened position, at which the door provides access to the fuel access compartment, and a closed position, at which the door blocks access to the fuel access compartment, and a locking assembly configured to lock the door at the closed position relative to the housing. The locking assembly includes a catch fixed to the housing and positioned within an interior of the fuel access compartment, a latch arm, and an actuation member. The latch arm includes a first end and a second end and is pivotably coupled to the door at a pivot point defined between the first and second ends of the latch arm, where the pivot point defines a first pivot axis. The latch arm is configured to be pivoted about the first pivot axis to selectively engage and disengage the latch arm with the catch. The actuation member is rotatable about a second pivot axis separate from the first pivot axis and is configured to engage the latch arm, where rotation of the actuation member about the second pivot axis results in the latch arm pivoting about the first pivot axis to disengage the latch arm from the catch.

In another aspect, the present subject matter is directed to a locking system for a fuel compartment assembly of a work vehicle. The locking system includes a housing at least partially defining a fuel access compartment, a door pivotally coupled to the housing and movable between an opened position, at which the door provides access to the fuel access compartment, and a closed position, at which the door blocks access to the fuel access compartment, and a locking assembly configured to lock the door at the closed position relative to the housing. The locking assembly includes a catch fixed to the housing and positioned within an interior of the fuel access compartment, and a latch arm. The latch arm includes a first end, positioned within the interior of the fuel access compartment, and a second end, positioned exterior to the fuel access compartment. The latch arm is pivotably coupled to the door at a pivot point defined between the first and second ends of the latch arm. The latch arm extends through a slot defined in the door such that the latch arm includes an exterior latch portion extending between the slot and the second end of the latch arm. The pivot point defines a pivot axis about which the latch arm is configured to be pivoted to selectively engage and disengage the latch arm with the catch, where the exterior latch portion is spaced apart from the pivot axis of the latch arm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
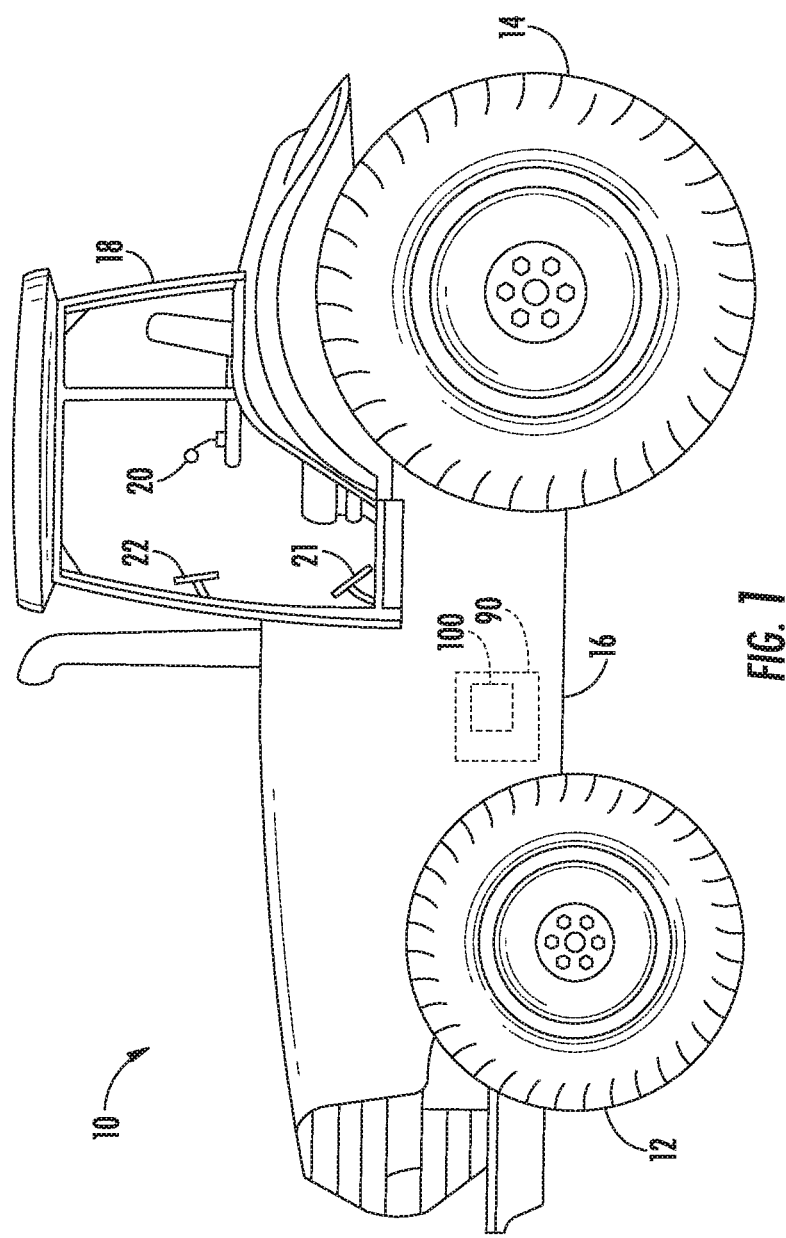
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved locking system for a fuel compartment assembly of a work vehicle. Specifically, the disclosed locking system is configured to more securely enclose a fuel access compartment of the fuel compartment assembly to prevent incidental opening during operation of the work vehicle and/or tampering by third parties. In several embodiments, the locking system includes a housing at least partially defining the fuel access compartment in which filler necks for one or more consumable fluid tanks, such as a diesel fuel tank and/or a diesel exhaust fluid (DEF) tank, are disposed. The fuel access compartment is accessible through an access window defined in the housing, which is selectively covered by a door of the locking system. The door is pivotably coupled to the housing to allow the door to be moved between an opened position, where the filler necks are accessible, and a closed position, where the filler necks are not accessible. The door is selectively fixable in the closed position by a locking assembly of the locking system. The locking assembly includes a catch fixed to the housing within an interior of the fuel access compartment and a latch arm pivotably coupled to the door about a pivot point defined between opposed first and second ends of the latch arm. The pivot point generally defines a pivot axis about which the latch arm is pivotable to selectively engage and disengage the latch arm with the catch, thereby allowing the door to be locked and unlocked, respectively, relative to the fuel compartment housing.

In some embodiments, the latch arm may be indirectly actuatable from an exterior of the fuel access compartment. For example, in one embodiment, the locking system may further include an actuation member, such as a cam, rotationally coupled to the door and positioned within the interior of the fuel access compartment. In such an embodiment, the actuation member may be configured to engage a portion of the latch arm such that rotation of the actuation member (e.g., by rotating a handle positioned along the exterior of the door) results in the latch arm being pivoted about its pivot axis in a manner that causes the latch arm to disengage the catch, thereby unlocking the door relative to the fuel compartment housing.

Alternatively, in other embodiments, the latch arm may be directly actuatable from the exterior of the fuel access compartment. For example, in one embodiment, a first end of the latch arm may be positioned within the interior of the fuel access compartment and an opposed second end of the latch arm may be positioned exterior to the fuel access compartment. For example, the latch arm may extend through a slot defined in the door along a portion of its length such that the latch arm has an exterior portion extending between the slot and the second end of the latch arm. In such an embodiment, the exterior portion of the latch arm may be directly actuated from outside of the fuel access compartment to pivot the latch arm about its pivot axis and, thus, cause the latch arm to be disengaged from or engaged with the catch to unlock or lock the door relative to the fuel compartment housing.

Referring now to the drawings, FIG. 1 illustrates a side view of one embodiment of a work vehicle 10 in accordance with aspects of the present subject matter. As shown, the work vehicle 10 is configured as an agricultural work vehicle, particularly as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair of rear wheels 14, and a chassis 16 coupled to and supported by the wheels 12, 14. An operator's cab 18 may be supported by a portion of the chassis 16 and may house various control or input devices 20, 21 (e.g., levers, pedals, control panels, buttons, and/or the like) for permitting an operator to control the operation of the work vehicle 10. For instance, as shown in FIG. 1, the work vehicle 10 may include an input lever 20 for controlling the engine speed of the work vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller. Moreover, as schematically shown in FIG. 1, the work vehicle 10 may include a locking system 90 configured for use with a fuel compartment assembly 100 of the vehicle 10. As will be described below, the fuel compartment assembly 100 may be configured to house filler necks that provide access to one or more supply tanks. In one embodiment, the fuel compartment assembly 100 may be positioned at or adjacent to one of the wheels 12, 14 of the work vehicle such that the fuel compartment assembly 100 is subject to mud and debris flung from the wheels 12, 14 during operation. However, in other embodiments, the fuel compartment assembly 100 may be positioned at any other suitable location on or within the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, the work vehicle may include an articulated chassis to steer the work vehicle 10, or rely on tracks in lieu of the wheels 12, 14. Additionally, the work vehicle 10 may also be configured to be operably coupled to any suitable type of work implement.

Referring now to FIGS. 2-9, various views of one embodiment of a locking system 90 and associated fuel compartment assembly 100 suitable for use with a work vehicle (e.g., the vehicle 10 shown in FIG. 1) are illustrated in accordance with aspects of the present subject matter. In general, the locking system 90 may be configured to be operatively associated with any suitable fuel compartment assembly have any suitable configuration. In the illustrated embodiment, the fuel compartment assembly 100 includes a fuel compartment housing 102 and an access door 104 pivotably coupled to the housing 102. The housing 102 may at least partially define a fuel access compartment 106 in which one or more filler necks 108A, 108B for filling one or more consumable fluid tanks (not shown) are at least partially disposed. It should be appreciated that the consumable fluid tanks may be configured to contain one or more fuels, fuel treatments, exhaust treatments and/or the like. For example, in one embodiment, the filler neck 108A may be configured to allow access to an interior of a diesel fuel tank (not shown) while the filler neck 108B may be configured to allow access to an interior of a diesel exhaust fluid (DEF) tank (not shown).

Figure 2:
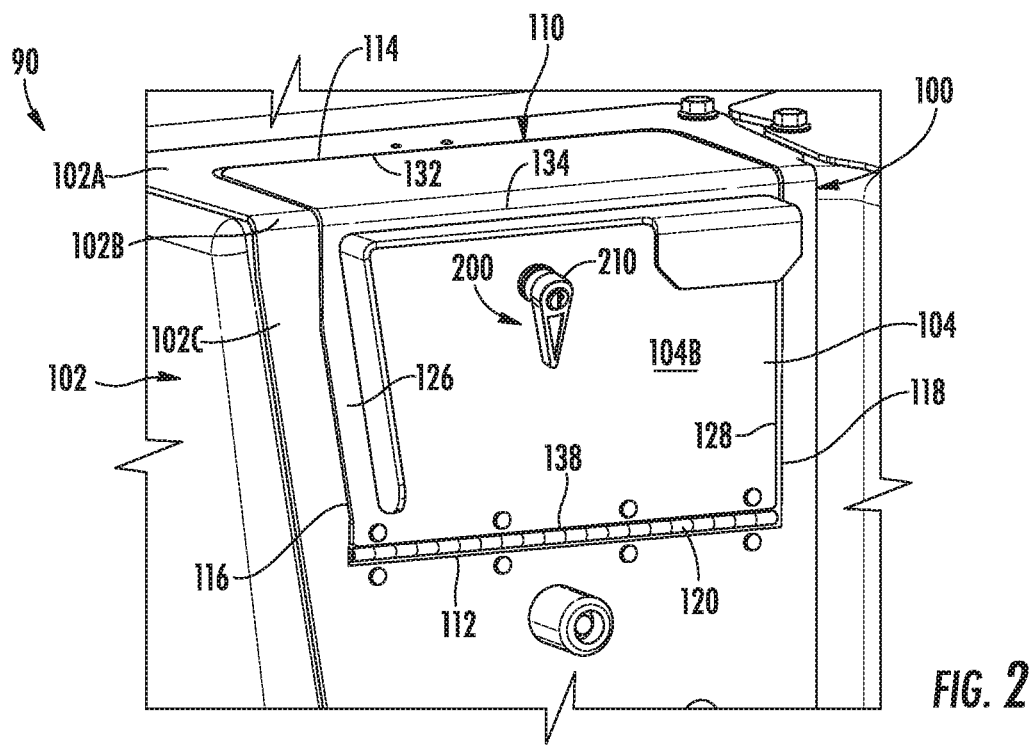
FIG. 2 illustrates a perspective view of one embodiment of a fuel compartment assembly and an associated locking system suitable for use with the work vehicle shown in FIG. 1 in accordance with aspects of the present subject matter, particularly illustrating a locking assembly of the locking system positioned relative to components of the fuel compartment assembly.
Figure 3:
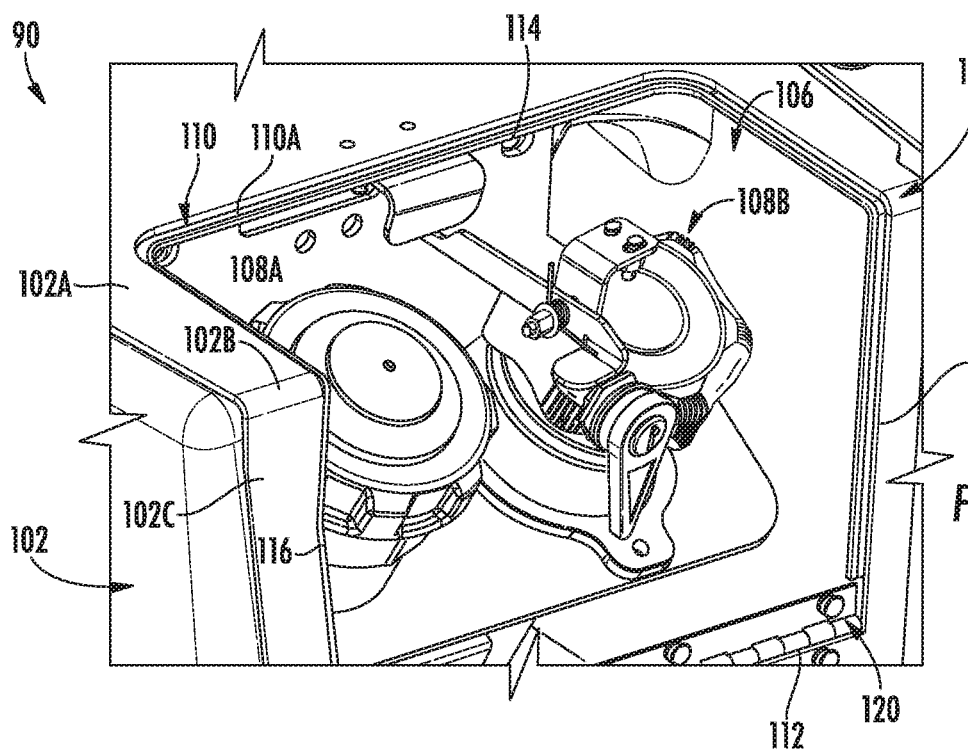
FIG. 3 illustrates a perspective view of the locking system shown in FIG. 2 with a door of the fuel compartment assembly being hidden from view for purposes of illustration, particularly illustrating the locking assembly positioned relative to components of the fuel compartment assembly in accordance with aspects of the present subject matter.

As particularly shown in FIG. 3, the housing 102 may generally define an opening or access window 110 through which the fuel access compartment 106 and filler necks 108A, 108B are accessible. The access window 110 is generally defined by various opposed edges of the housing 102, such as a lower edge 112, an upper edge 114 opposite the lower edge 112, a forward edge 116, and an aft edge 118 opposite the forward edge 116. The door 104 may be pivotably coupled to the housing 102 by a hinge 120 such that the door 104 may selectively cover the access window 110 of the fuel access compartment 106 and at least partially define the fuel access compartment 106. For example, the door 104 is generally pivotable between a closed position (FIGS. 2 and 9), at which the door 104 encloses or covers the access window 110 of the fuel access compartment 106 such that the interior of the fuel access compartment 106 and the filler necks 108A, 108B contained therein are not accessible, and an opened position (FIG. 7), at which the access window 110 is uncovered to allow the interior of the fuel access compartment 106 and the filler necks 108A, 108B contained therein to be accessed.

More specifically, the door 104 is pivotable in an opening direction (e.g., as shown by arrow 122 in FIG. 9) from the closed position towards the opened position and in a closing direction (e.g., as shown by arrow 124 in FIG. 7) from the opened position towards the closed position, with the opening direction being opposite the closing direction. In some embodiments, as shown in FIGS. 2-3, the hinge 120 pivotably couples the door 104 to the housing 102 at or adjacent to the lower edge 112 of the access window 110 about a horizontal axis such that the opening direction 122 is downward and the closing direction 124 is upward. However, it should be appreciated that the door 104 may otherwise be coupled to the housing 102, such as at the upper edge 114 of the access window 110 such that the opening direction 122 is upward and the closing direction 124 is downward, or at one of the fore or aft edges 116, 118 of the access window 110 such that the opening and closing directions 122, 124 are defined about a vertical axis.

In one embodiment, as shown in FIGS. 2 and 3, the housing 102 includes an upper housing side 102A and a lateral housing side 102C, with the access window 110 for the fuel compartment 106 being defined along portions of both of such housing sides 102A, 102C and across an edge 102B of the housing 102 defined between the adjacent housing sides 102A, 102C. In such an embodiment, the door 104 may generally be configured to match or conform to the shape of the housing 102 around the access window 110 to allow the door 1004 to fully cover the access window 110. For example, in the illustrated embodiment, the door 104 may have an L-shaped configuration. More particularly, as shown in FIG. 2, the door 104 extends between a forward end 126 configured to be positioned adjacent to the forward edge 116 of the access window 110 and an aft end 128 configured to be positioned adjacent to the aft edge 118 of the access window 110. Additionally, as shown in FIG. 2, the door 103 includes both a top wall portion 130 extending between an upper end 132 of the door 104 and a corner 134 of the door 104 configured to be aligned with the edge 102B of the housing 102, and a side wall portion 136 extending between the corner 134 and a lower end 138 of the door 104. The top and side wall portions 130, 136 of the door 104 are generally configured to be oriented relative to each other in the same manner as the upper and lateral housing sides 102A, 102C of the housing 102 such that the door 104 may lie flush against a lip 1104 (FIG. 3) formed around the access window 110 of the fuel access compartment 106 when moved to its closed position. Alternatively, while not shown, in other embodiments, the access window 110 may be configured to be defined relative to any other suitable portion of the housing 102, with the door 104 being appropriately configured to cover the window 110. For example, in another embodiment, the access window 110 may be defined along a single wall or side of the housing 102 such that the door 104 may include only a single wall portion 130, 136. Regardless of the orientation and/or positioning of the access window 110, it may be desirable for the door 104 to sit flush with the housing 102 around the access window 110 when in the closed position such that it is more difficult to insert a tool under the door 104 and into the fuel access compartment 106 to pry open the door 104.

Figure 4:
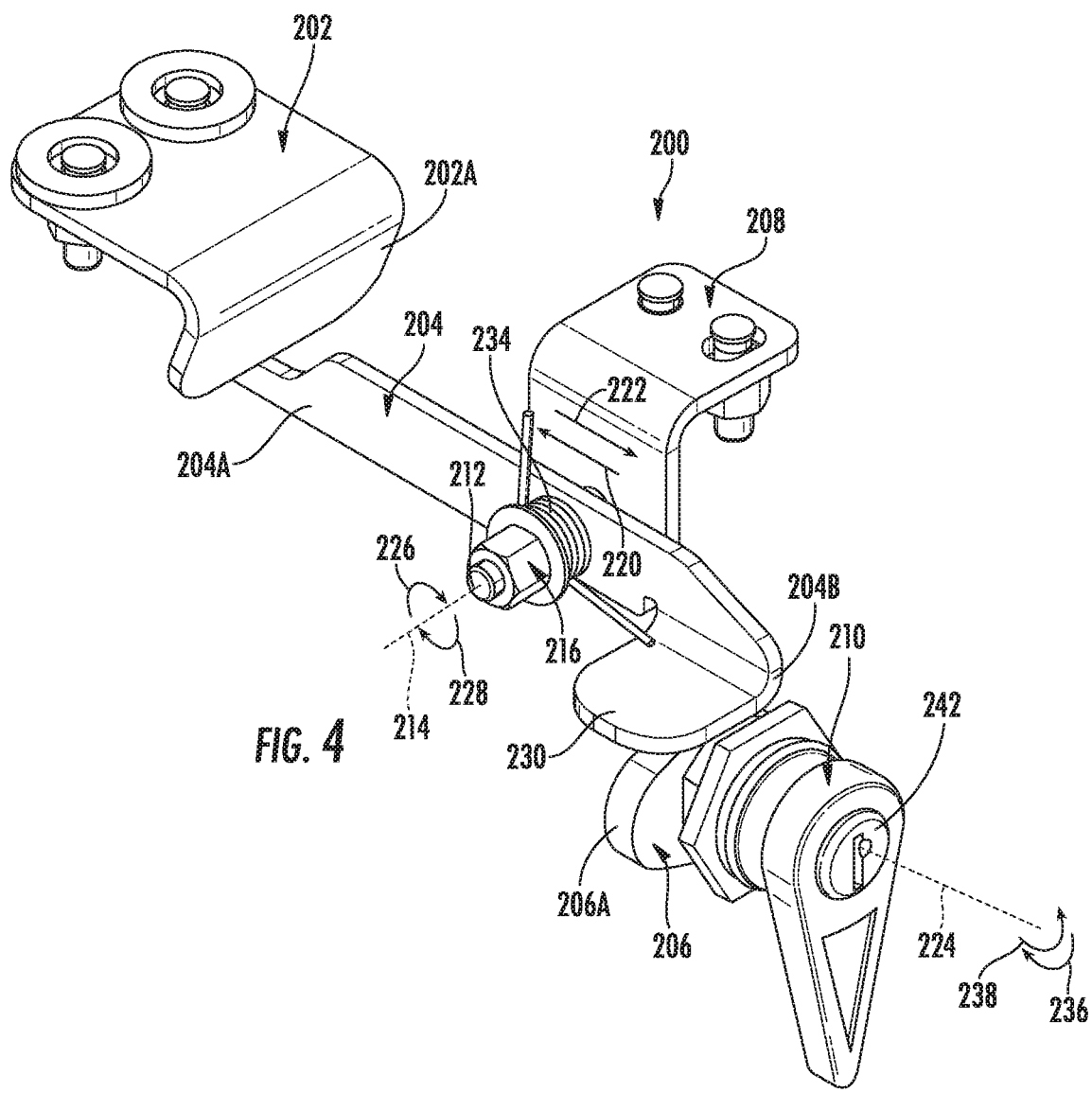
FIG. 4 illustrates a perspective view of the locking assembly shown in FIG. 3 in accordance with aspects of the present subject matter.

In several embodiments, the door 104 may be configured to be selectively pivotable between its closed and opened positions based on an orientation or locked/unlocked state of an associated locking assembly 200 of the disclosed system 90. In general, the locking assembly 200 may include several components configured to selectively engage or disengage the door 104 relative to the housing 102. For example, as shown in FIG. 4, the locking assembly 200 includes a catch 202, a latch arm 204, and an actuation member 206. As shown in the illustrated embodiment, the catch 202 is configured to be supported by or fixed to the housing 102 and positioned within the interior of the fuel compartment assembly 106, whereas the latch arm 204 is configured to be pivotably coupled to the door 104 and configured to be selectively engaged and disengaged with the catch 202. Additionally, the actuation member 206 is rotatably coupled to the door 104 and configured to engage the latch arm 204 such that rotation of the actuation member 206 results in the latch arm 204 pivoting relative to the catch 202, thereby allowing the latch arm 204 to be disengaged from the catch 202. Additionally, the locking assembly 200 may include a mounting bracket 208 fixed to an interior surface 104A the door 104 and a handle 210 positioned exterior of the fuel access compartment 106 along an exterior surface 104B of the door 104, with the handle 210 being rotationally coupled to the actuation member 206 positioned along the interior surface 104B of the door 104. As will be described below, depending on the positioning or orientation of the components of the locking assembly 200, the locking assembly 200 may be configured to lock the door 104 at the closed position relative to the housing 102.

Figure 7:
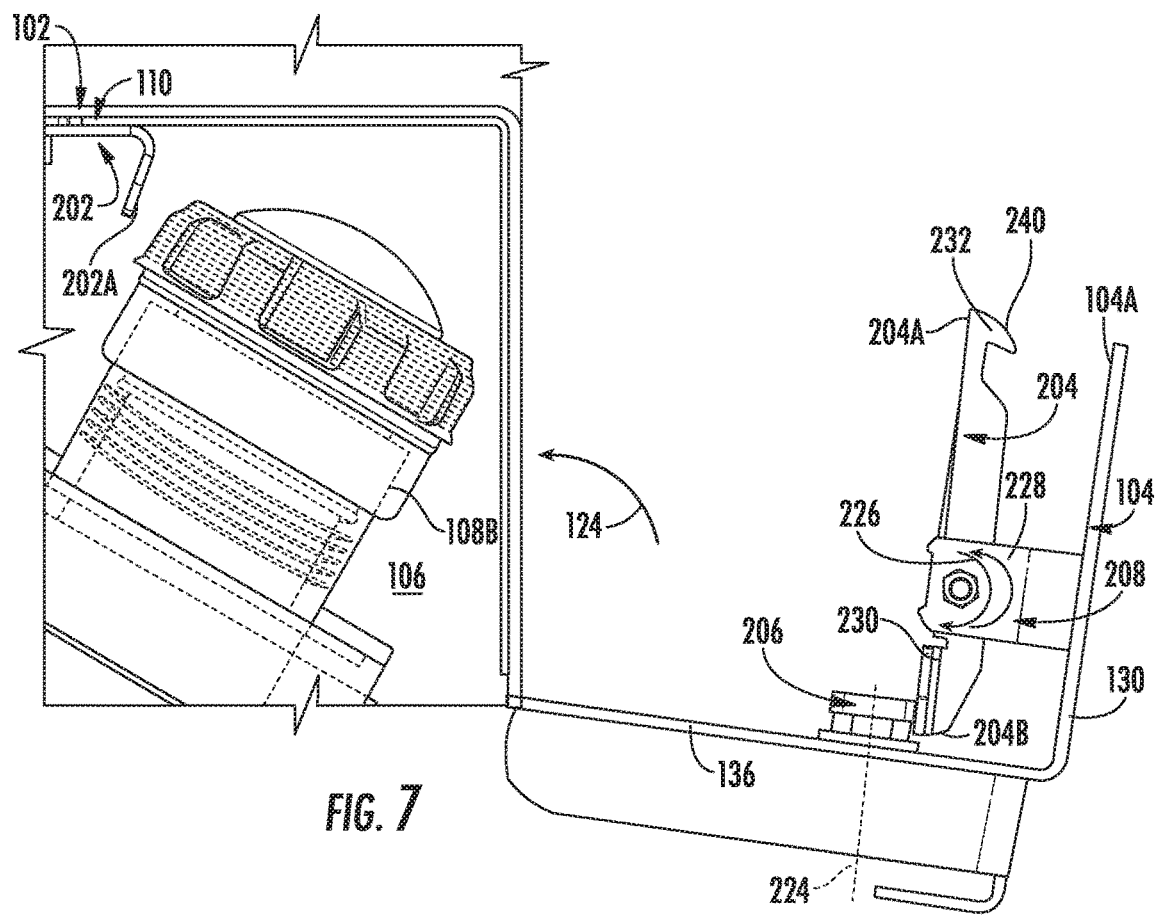
FIG. 7 illustrates a section view of the locking system shown in FIG. 2 in accordance with aspects of the present subject matter, particularly illustrating the door in an opened position.
Figure 8:
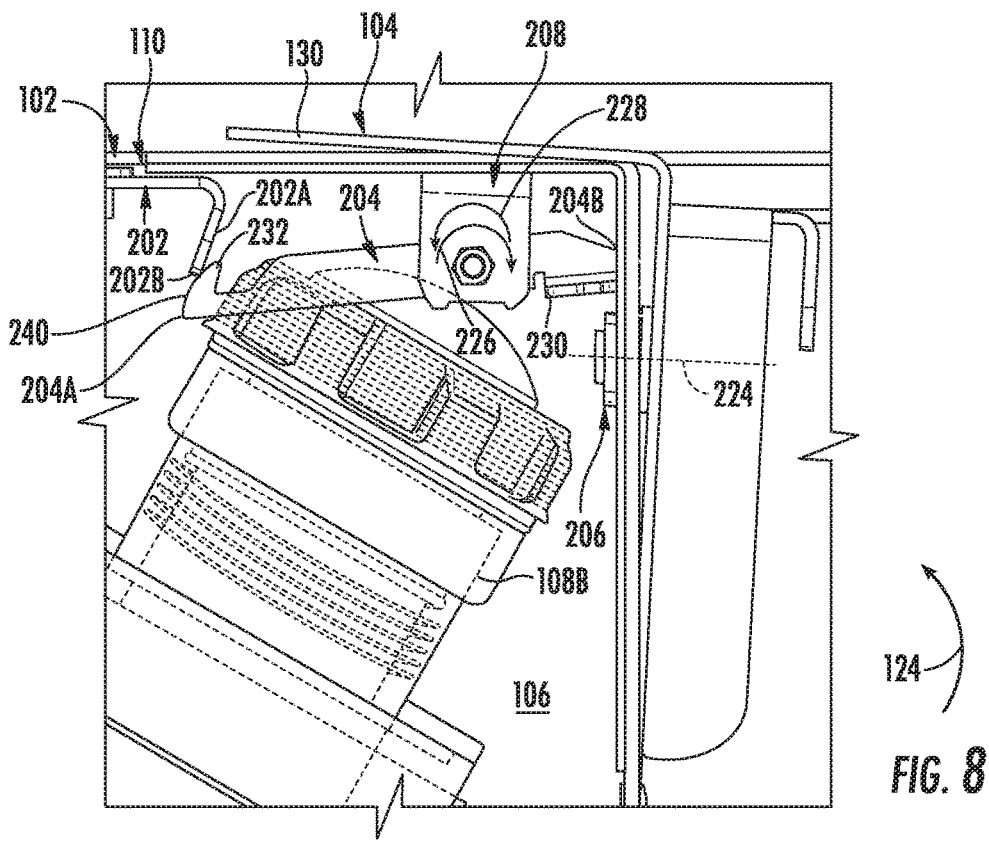
FIG. 8 illustrates a similar section view of the locking system as that shown in FIG. 7, particularly illustrating the operation of the locking assembly as the door is being moved from the opened position to a closed position.
Figure 9:
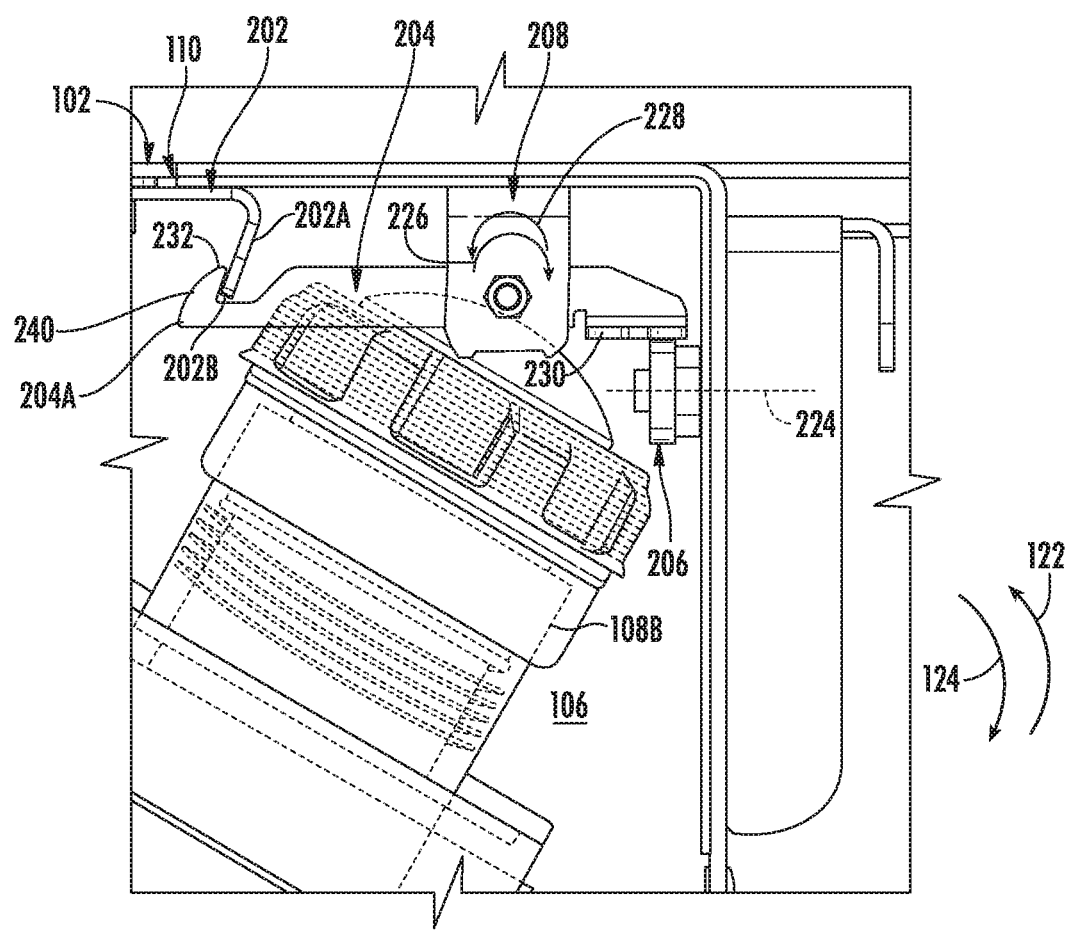
FIG. 9 illustrates another similar section view of the locking system as that shown in FIG. 7, particularly illustrating the locking assembly in a locked state or position when the door is moved to its closed position.
Figure 10:
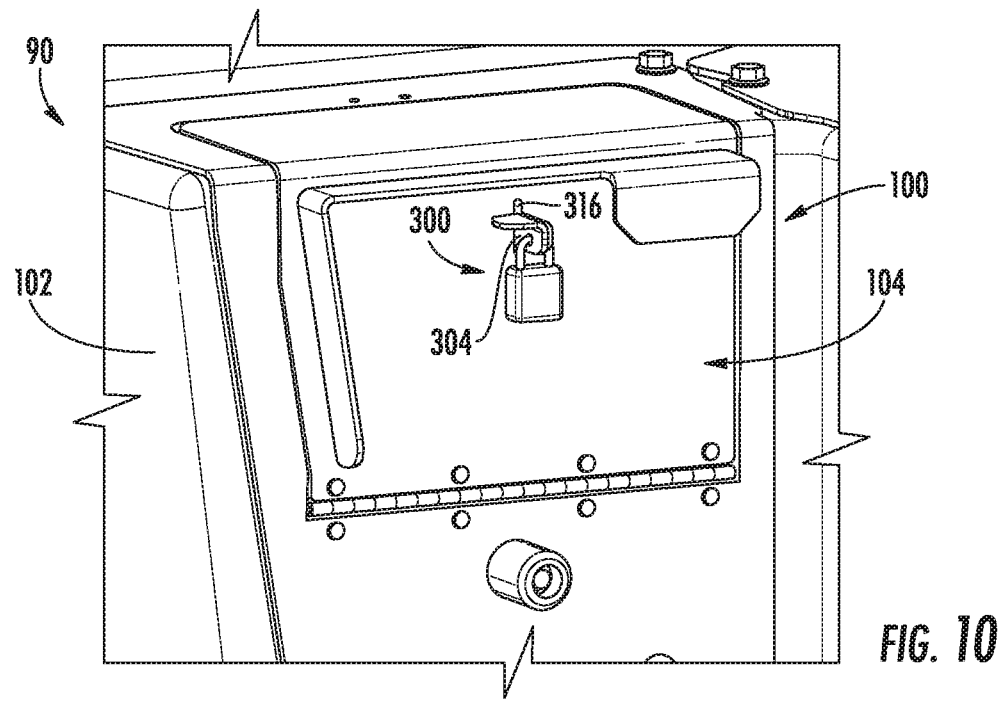
FIG. 10 illustrates a perspective view of another embodiment of a fuel compartment assembly and an associated locking system suitable for use with the work vehicle shown in FIG. 1 in accordance with aspects of the present subject matter.
Figure 11:
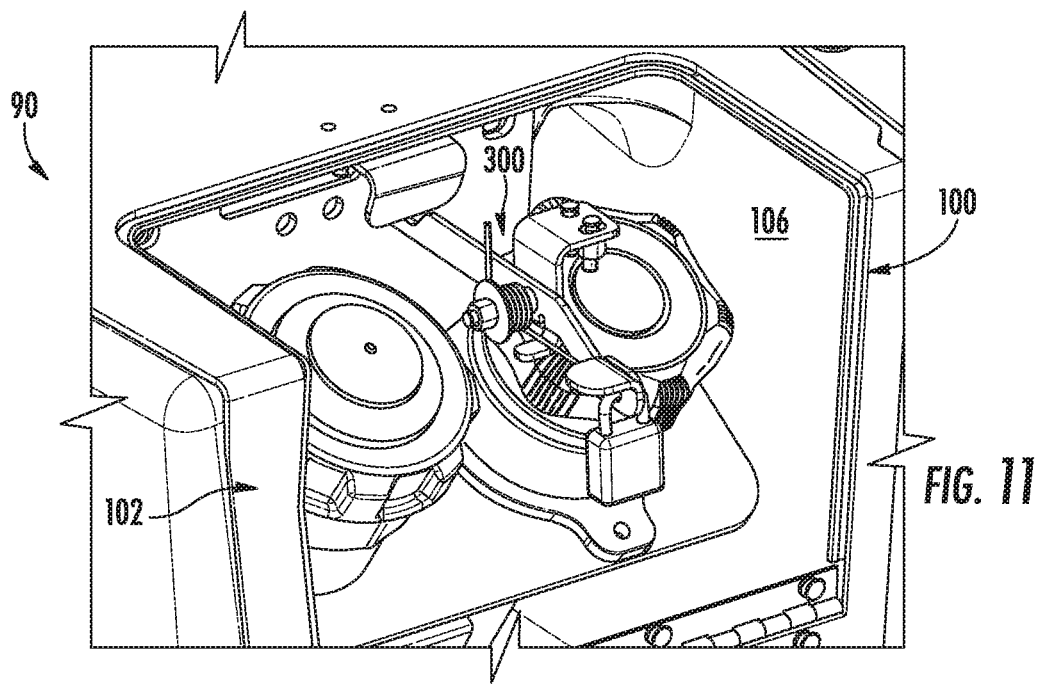
FIG. 11 illustrates a perspective view of the locking system shown in FIG. 10 with a door of the fuel compartment assembly hidden from view for purposes of illustration, particularly illustrating a locking assembly of the locking system positioned relative to components of the fuel compartment assembly in accordance with aspects of the present subject matter.

As shown in FIG. 4, the latch arm 204 generally includes a first end 204A and a second end 204B and is pivotably coupled to the door 104 (e.g., via the mounting bracket 208) at a pivot point 212 defined between the first and second ends 204A, 204B of the latch arm 204. A first pivot axis 214 is defined at the pivot point 212 about which the latch arm 204 is configured to pivot in order to selectively engage and disengage the catch 202. More particularly, the latch arm 204 is configured to pivot or rotate about the first pivot axis 214 to selectively engage and disengage the first end 204A of the latch arm 204 with the catch 202. For example, an outward projection or cleft 232 formed at the first end 2044 of the latch arm 204 may be configured to engage the catch 202, as shown in FIG. 9, such that the door 104 is fixed relative to the access window 110 of the fuel access compartment 106, or disengage from the catch 202, as shown in FIGS. 7 and 8, such that the door 104 is movable relative to the access window 110 of the fuel access compartment 106.

Figure 5:
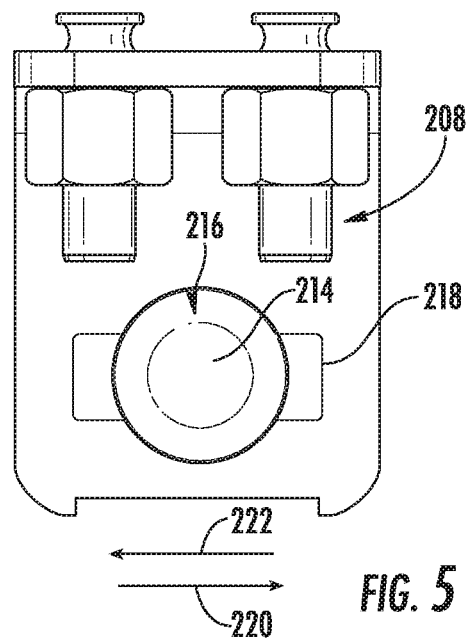
FIG. 5 illustrates a side view of a mounting bracket of the locking assembly shown in FIG. 4 in accordance with aspects of the present subject matter, particularly illustrating an adjustment slot of the mounting bracket.

As shown in FIGS. 4 and 5, the locking assembly 200 also includes a pivot member 216 (e.g., a bolt) extending along the first pivot axis 214 for pivotally coupling the latch arm 204 to the mounting bracket 208 (and, thus, for pivotally coupling the latch arm 204 to the door 104). More particularly, in several embodiments, the pivot member 216 may be configured to extend through a portion of the mounting bracket and may be rigidly coupled to the latch arm 204 such that the latch arm 204 and the pivot member 216 pivot together relative to the mounting bracket 208 about the first pivot axis 214. As particularly shown in FIG. 5, in one embodiment, the pivot member 216 may be configured to be received through an elongated adjustment slot 218 defined in the mounting bracket 208. In such an embodiment, the position of the pivot member 216 within the adjustment slot 218 is selectively adjusted, as necessary or desired, to adjust the relative positioning of the latch arm 204 within the interior of the fuel access compartment 106, particularly the positioning of the first end 2044 of the latch arm 204 relative to the catch 202. As such, the relative location of pivot member 216, and the associated first pivot axis 214, within the adjustment slot 218 may be adjusted to ensure proper alignment and/or engagement of the cleft 232 positioned at the first end 204A of the latch arm 204 with the catch 202. For example, the pivot member 216 may be moved within the adjustment slot 218 relative to the mounting bracket 208 in both an inward direction (e.g., as shown by arrow 220 in FIGS. 4 and 5) and an outward direction (e.g., as shown by arrow 222 in FIGS. 4 and 5) to ensure proper alignment/engagement between the cleft 232 and the catch 202.

In several embodiments, the pivoting of the latch arm 204 about the first pivot axis 214 may be controlled, at least in part, based on the rotational position of the actuation member 206 positioned along the interior side of the door 104 and the associated handle 210 positioned along the exterior side of the door 104. Specifically, as shown in at least FIGS. 7-9, the actuation member 206 is rotatably coupled to the sidewall 136 of the door 104 along its interior surface 104A while the handle 210 is rotatably coupled to the sidewall 136 of the door 104 along its exterior surface 104B. In general, the actuation member 206 and the associated handle 210 are configured to be rotated relative to the door 104 about a second pivot axis 224 (which is separate from the first pivot axis 214 of the latch arm 204), with such rotation of the actuator member 206 being converted into pivoting of the latch arm 204 about the first pivot axis 214. More particularly, as is shown in FIGS. 4 and 6, a flange 230 formed at the second end 204B of the latch arm 204 is configured to engage or abut against an outer surface 206A of the actuation member 206 such that rotation of the actuation member 206 about the second pivot axis 224 causes the latch arm 204 to generally pivot about the first pivot axis 214, thereby allowing the cleft 232 positioned at the opposed end of the latch arm 204 to be moved into or out of engagement with the catch 202.

Figure 6:
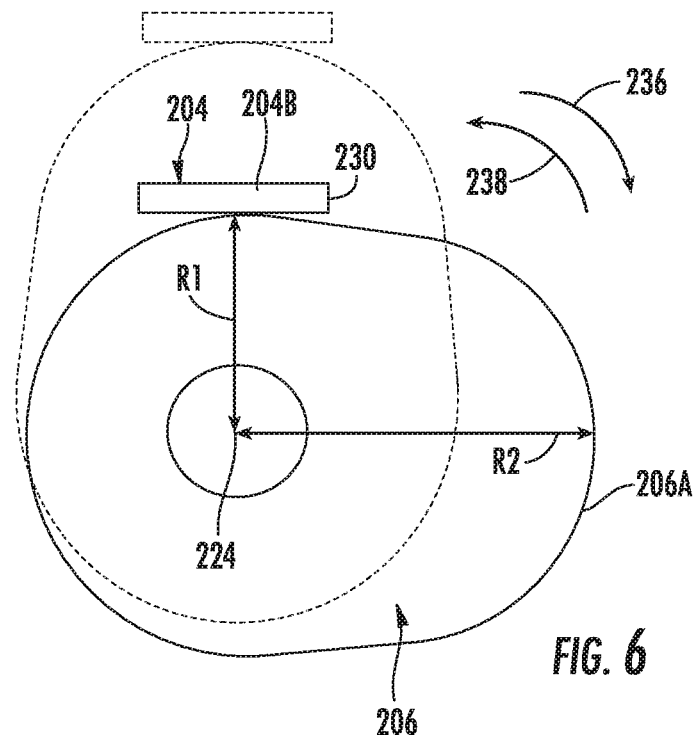
FIG. 6 illustrates a front view of an actuating member of the locking assembly shown in FIG. 4 in accordance with aspects of the present subject matter, particularly illustrating the actuating member rotated between rotational positions.

In one embodiment, as particularly shown in FIG. 6, the actuation member 206 may be configured as a cam, with the outer surface 206A of such member 206 corresponding to a cam surface defining an asymmetric cam profile. In such an embodiment, as the actuation member 206 is rotated relative to the latch arm 204 about the second pivot axis 224, the flange 230 positioned at the second end 204B of the latch arm 204 may ride along the outer cam surface 206A, thereby resulting in pivoting of the latch arm 204 about its separate pivot axis 214 as the outer radial profile of the actuation member 206 changes. For example, as shown in FIG. 6, the actuation member 206 may be configured to be rotated relative to the latch arm 204 between a first or locked position (as shown in solid lines) and a second or unlocked position (as shown in dashed lines). In such an embodiment, the outer radial profile of the actuation member 206 may be selected such that rotation of the actuation member 206 about the second pivot axis 224 between the locked and unlocked positions results in corresponding pivotable motion of the latch arm 204 about its pivot axis 214 in either a locking direction (as indicated by arrows 226 in FIG. 4) or an unlocking direction (as indicated by arrows 228 in FIG. 4). As shown in the illustrated embodiment, when the actuation member 206 is located at its locked position relative to the second end 204B of the latch arm 204, the outer cam surface 206A of the actuation member 206 is separated from the second pivot axis 224 by a first radial distance R1 whereas, when the actuation member 206 is at its unlocked position relative to the second end 204B of the latch arm 204, the outer cam surface 206A of the actuation member 206 is separated from the second pivot axis 224 by a larger second radial distance R2. As such, when the actuation member 206 is rotated in a first direction (as indicated by arrow 238) from its locked position to its unlocked position, the second end 20413 of the latch arm 204 may be pushed upwardly as it follows the outer cam surface 206A of the actuation member 206, thereby causing the first end 204A of the latch arm 204 to move downwardly away from the catch 202 as the latch arm 204 pivots about its pivot axis 214 in the unlocking direction 228. In such an embodiment, the differential between the first and second radial distances R1, R2 may be selected such that the latch arm 204 pivots sufficiently in the unlocking direction 228 to allow the cleft 232 to clear the catch 204. In contrast, when the actuation member 206 is rotated in an opposite, second direction (as indicated by arrow 236) from its unlocked position back to its locked position, the second end 204B of the latch arm 204 may be allowed to move downwardly as it follows the outer cam surface 206A of the actuation member 206A, thereby causing the cleft 232 positioned at the first end 204A of the latch arm 204 to move upwardly into engagement with the catch 202 as the latch arm 204 pivots about its pivot axis 214 in the locking direction 226.

It should be appreciated that, in order to maintain the second end 204A of the latch arm 204 in engagement with the actuation member 206 (particularly as the actuation member 206 is being rotated in the second direction 236 back to the locked position), the locking assembly 200 may further include a biasing member configured to bias the latch arm 204 to pivot about its pivot axis 214 in the locking direction 226. For example, as shown in FIG. 4, the locking assembly 200 may include a torsion spring 234 installed relative to the latch arm 204 about its pivot axis 214 such that the spring 234 applies a torsional force against the latch arm 204 that biases the latch arm 204 to pivot in the locking direction 226, thereby forcing the second end 204B of the latch arm 204 down into engagement with the actuation surface 206A. In addition, although not shown, a torsional biasing member may also be provided in operative association with the actuation member 206 and/or the associated handle 210 such that, when the handle 210 is released along the exterior of the door 104, the actuation member 206 is biased back into its locked position. As such, the locking assembly 200, as a whole, may be biased into its locked orientation, thereby helping to prevent the door 104 from being inadvertently opened during operation of the work vehicle.

Additionally, in several embodiments, the locking assembly 200 may be configured to automatically latch or lock when the door 104 is closed. Specifically, FIGS. 7-9 illustrate a sequence of views as the door 104 is moved from its opened position (FIG. 7) to a partially closed position (FIG. 8) and from the partially closed position to its fully closed position (FIG. 9). As particularly shown in FIG. 8, as the door 104 is pivoted in the closing direction 124 from its opened position toward its closed position, and while the actuation member 206 is in its locked position, an outer surface 240 of the cleft 232 positioned at the first end 204A of the latch arm 204 begins to ride or slide along an adjacent angled surface 202A of the catch 202, thereby causing the latch arm 204 to pivot about the first pivot axis 214 in the unlocking direction 228 as the first end 204A of the latch arm 204 is forced downwardly due to contact with the angled surface 202A of the catch 202. As door 104 is pushed further inwardly towards its fully closed position, the cleft 232 will ride along the angled surface 2024 until the cleft 232 clears a lower or bottom end 202B of the catch 202, thereby allowing the cleft 232 to pass underneath the catch 202. Thereafter, the biasing force providing by the spring 232 may cause the latch arm 204 to pivot about its pivot axis 214 in the locking direction 226, thereby causing the first end 204A of the latch arm 204 to pivot upwardly such that the cleft 232 is captured behind and/or otherwise engages with the catch 202, thereby locking the door 104 in its closed position relative to the fuel compartment housing 102. It should be appreciated that, in one embodiment, the outer surface 240 of cleft 232 may configured as an arcuate or curved surface to facilitate sliding of the cleft 232 along the angled surface 202A of the catch 202 as the door 104 is moved to its closed position.

As indicated above, the internal actuation member 206 may be actuated or rotated via the external handle 210 of the locking assembly 200. Specifically, the handle 210 is configured to be positioned exterior of the fuel access compartment 106, e.g., along the exterior surface 104B of the door 104, and is rotationally coupled to the internal actuation member 206 via a suitable shaft or other connection extending through the door 104. As such, rotation of the handle 210 along the exterior of the door 104 results in rotation of the actuation member 106 within the interior of the fuel access compartment. Moreover, in some embodiments, the handle 210 may have an integrated lock 242 as shown in FIG. 4. As such, when locked, the handle 210 may be prevented from being used to rotate the internal actuation member 206 about the second pivot axis 224.

Referring now to FIGS. 10-13, various views of another embodiment of a locking assembly 300 suitable for use within the disclosed locking system 90 are illustrated in accordance with aspects of the present subject matter. Specifically, FIGS. 10-13 illustrate the locking assembly 300 being used in association with the fuel compartment assembly 100 described above with reference to FIGS. 2-9. However, it should be appreciated that, in general, the locking assembly 300 may be utilized in operative association with any suitable fuel compartment assembly having any other suitable configuration.

Figure 12:
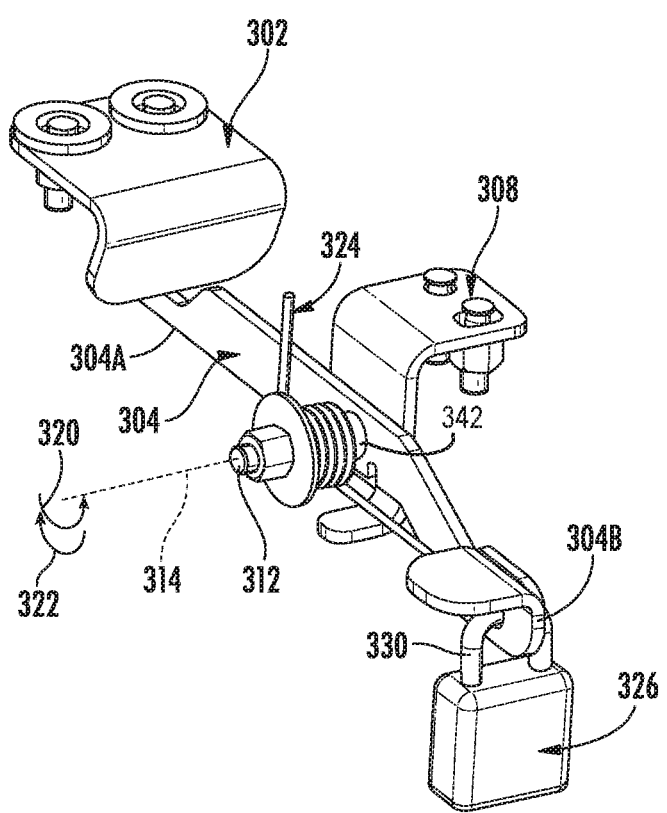
FIG. 12 illustrates a perspective view of the locking assembly shown in FIG. 11 in accordance with aspects of the present subject matter.

As shown in the illustrated embodiment, similar to the locking assembly 200 described above, the locking assembly 300 may include several components configured to selectively engage or disengage the door 104 with the housing 102. For example, as shown in FIG. 12, the locking assembly 300 may include a catch 302 configured to be supported by or fixed to the housing 102 and positioned within the interior of the fuel access compartment 106. In addition, the locking assembly 300 includes a latch arm 304 having a first end 304A and a second end 304B, with the latch arm 304 being pivotably coupled to the door 104 via an associated mounting bracket 308. Specifically, similar to the embodiment described above, the latch arm 304 may be pivotally coupled to the mounting bracket 308 (and, thus, the door 104) at a pivot point 312 defined between the first and second ends 304A, 304B of the latch arm 304. In such an embodiment, the latch arm 304 may be configured to be pivoted about a pivot axis 314 defined by the pivot point 312 to allow the latch arm 304 to be selectively engaged with and disengaged from the catch 302.

In the illustrated embodiment, the catch 302, the latch arm 304, and the mounting bracket 308 are generally configured the same as or similar to the catch 202, the latch arm 204, and the mounting bracket 208, respectively, described above with reference to FIGS. 2-9. However, unlike the latch arm 204 described above that is configured to be positioned entirely within the interior of the fuel access compartment 106 when the door 104 is the closed position (thereby requiring the latch arm 204 to be indirectly actuated via rotation of the actuation member 206 and the associated handle 210), a portion of the latch arm 304 is configured to positioned exterior of the fuel access compartment 106 when the door 104 is in the closed position, thereby allowing the latch arm 304 to be directly actuated along the exterior of the door 104. Specifically, in the illustrated embodiment, the first end 304A of the latch arm 304 is configured to be positioned within the interior of the fuel access compartment 106 while the second end 304B of the latch arm 304 is configured to be positioned exterior of the fuel access compartment 106. In such embodiment, the latch arm 304 may be configured to extend through a slot 316 defined in the door 104 such that the latch arm 304 includes an exterior latch portion 318 extending between the slot 316 and the second end 304B of the latch arm 304 along the exterior of the door 104. Specifically, the exterior latch portion 318 corresponds to a graspable lengthwise section of the latch arm 304 positioned along the exterior side of the door 104 that is spaced apart and separate from the pivot axis 314 of the latch arm 304 defined along the interior side of the door 104. With such a configuration, the door 104 may be locked and unlocked relative to the fuel compartment housing 102 by directly actuating the second end 304B of the latch arm 304) up or down relative to the door 104 (e.g. via grasping the exterior latch portion 318 of the latch arm 304), thereby causing the latch arm 304 to pivot about its pivot axis 314.

For example, in the illustrated embodiment, by pushing the second end 304B of the latch arm 304 upwardly relative to the door 104, the latch arm 304 may pivot about the pivot axis 314 in the unlocking direction 320, thereby resulting in the opposed first end 304A of the latch arm 304 being pivoted downwardly so as to disengage the latch arm 304 from the catch 302. Similarly, by pushing the second end 304B of the latch arm 304 downwardly relative to the door 104, the latch arm 304 may pivot about the pivot axis 314 in the opposite, locking direction 322, thereby resulting in the opposed first end 304A of the latch arm 304 being pivoted upwardly so as to engage the latch arm 304 with the catch 302. Alternatively, when the locking assembly 300 includes a biasing mechanism (e.g., a torsion spring 324) configured to bias the latch arm 304 into engagement with the catch 302, the second end 304B of the latch arm 304 may simply be released to allow the latch arm 304 to be re-engaged with the catch 302.

Figure 13:
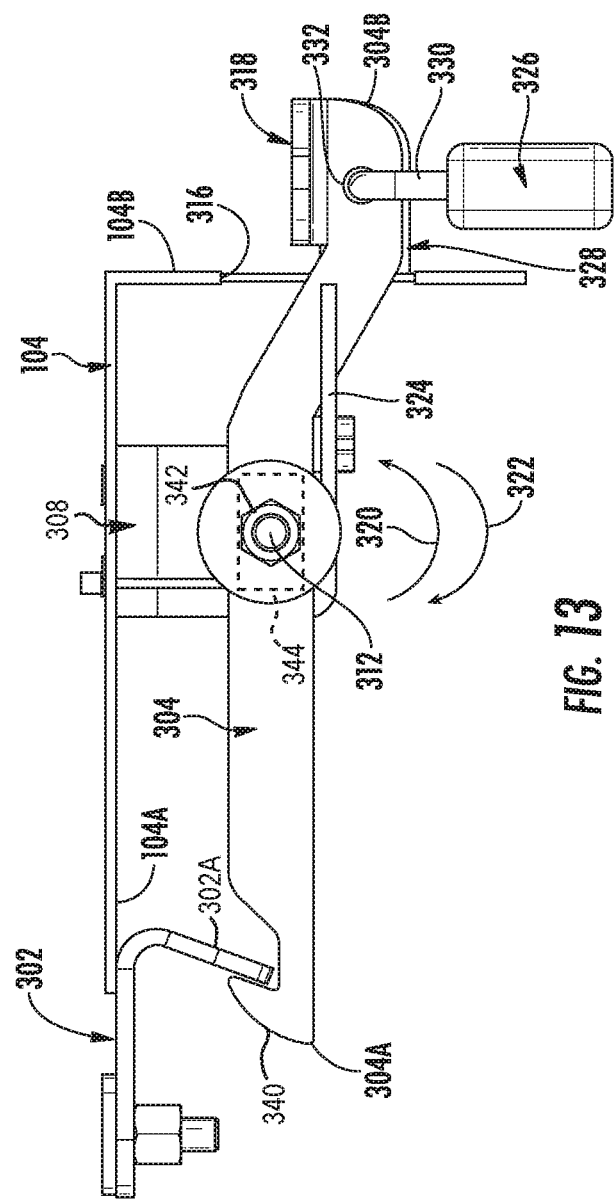
FIG. 13 illustrates a partial, side view of the locking system shown in FIG. 11 in accordance with aspects of the present subject matter, particularly illustrating the locking assembly relative to the door of the fuel compartment assembly.

As particularly shown in FIG. 13, in some embodiments, the catch 302 may have an angled surface 302A similar to the angled surface 202a of the catch 202 of the embodiment described above with reference to the locking assembly 200. Further, the first end 304A of the latch arm 304 may have an arcuate outer surface 340 similar to the arcuate outer surface 240 of the latch arm 204 described above with reference to the locking assembly 200. The arcuate outer surface 340 may ride or slide along the angled surface 302A of the catch 302 as the door 104 is pivoted in the closing direction 124 from its opened position toward its closed position such that the latch arm 304 pivots about the pivot axis 314 due to contact with the angled surface 302A until the first end 304A of the latch arm 304 clears the angled surface 302A. As such, a user does not need to actuate the second end 304B of the latch arm 304 before moving the door 104 towards the closed position.

Additionally, as shown in at least FIGS. 12 and 13, in one embodiment, the locking assembly 300 includes a pivot member 342 (e.g., a bolt) similar to the pivot member 216 described above with reference to the locking assembly 200. More particularly, the pivot member 342 may extend along the pivot axis 314 for pivotally coupling the latch arm 304 to the mounting bracket 308 (and, thus, for pivotally coupling the latch arm 304 to the door 104). As shown in FIG. 13, the pivot member 342 may be configured to be received through an elongated adjustment slot 344 defined in the mounting bracket 308, similar to the adjustment slot 218 described above with reference to the locking assembly 200. In such an embodiment, the position of the pivot member 342 within the adjustment slot 344 is selectively adjusted, as necessary or desired, to adjust the relative positioning of the latch arm 304 within the interior of the fuel access compartment 106, particularly the positioning of the first end 304A of the latch arm 304 relative to the catch 302.

In some embodiments, the latch arm 304 may be configured to be selectively lockable against rotation about the pivot axis 314. More particularly, the latch arm 304 may be configured to be rotationally fixed to the housing 102 by a separate locking device 326. For example, as shown in the illustrated embodiment, the housing 102 includes a locking flange 328 having a flange opening (not shown) for receiving a latching portion 330 of the locking device 326 and the exterior latch portion 318 of the latch arm 304 is similarly configured with an arm opening 332 configured to receive the latching portion 330 of the locking device 326. By directly rotationally fixing the latch arm 304 to the housing 102 by the locking device 326, the latch arm 304 is further prevented from inadvertently uncoupling or disengaging from the catch 302 during operation of the work vehicle 10. While the locking device 326 is shown in the illustrated embodiment as being a padlock, it should be appreciated that in other embodiments, the locking device 326 may be any other suitable mechanism that may selectively rotationally fix the latch arm 304 to the housing 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A locking system for a fuel compartment assembly of a work vehicle, the locking system comprising:
    a housing at least partially defining a fuel access compartment;
    a door pivotally coupled to the housing and movable between an opened position, at which the door provides access to the fuel access compartment, and a closed position, at which the door blocks access to the fuel access compartment; and
    a locking assembly configured to lock the door at the closed position relative to the housing, the locking assembly comprising:
        a catch fixed to the housing and positioned within an interior of the fuel access compartment;
        a latch arm including a first end and a second end and being pivotably coupled to the door at a pivot point defined between the first and second ends of the latch arm, the pivot point defining a first pivot axis, the latch arm configured to be pivoted about the first pivot axis to selectively engage and disengage the latch arm with the catch; and an actuation member rotatable about a second pivot axis separate from the first pivot axis and configured to engage the latch arm, wherein rotation of the actuation member about the second pivot axis results in the latch arm pivoting about the first pivot axis to disengage the latch arm from the catch.

2. The locking system of claim 1, wherein the first end of the latch arm selectively engages and disengages the catch with rotation of the latch arm about the first pivot axis.

3. The locking system of claim 2, wherein the actuation member engages the second end of the latch arm.

4. The locking system of claim 3,
wherein the first end of the latch arm has a cleft configured to engage the catch, and
wherein the second end of the latch arm has a flange configured to engage the actuation member.

5. The locking system of claim 4, wherein the cam has a cam surface defining a cam profile, the portion of the latch arm being configured to abut against the cam surface such that rotation of the cam about the second pivot axis results in pivoting of the latch arm about the first pivot axis to selectively disengage the catch.

6. The locking system of claim 1, wherein the actuation member is a cam positioned within the interior of the fuel access compartment, the cam configured to engage a portion of the latch arm.

7. The locking system of claim 1, further comprising a handle positioned on an exterior of the fuel access compartment and rotationally coupled with the actuation member.

8. The locking system of claim 7, further comprising a spring coupled to the latch arm and configured to bias the latch arm to pivot about the first pivot axis in the locking direction towards the catch.

9. The locking system of claim 8, wherein the first end of the latch arm has an arcuate outer surface configured to ride along the angled surface of the catch as the door is moved from the opened position to the closed position.

10. The locking system of claim 9, wherein the mounting bracket defines an adjustment slot configured to receive the pivot member, a position of the pivot member within the adjustment slot being adjustable to adjust a position of the latch arm relative to the catch.

11. The locking system of claim 1, wherein the latch arm is pivotable relative to the catch in a locking direction, in which the latch arm is pivoted about the first pivot axis towards the catch, and an unlocking direction, in which the latch arm is pivoted about the first pivot axis away from the catch, wherein rotation of the actuation member about the second pivot axis results in the latch arm being pivoted about the first pivot axis in the unlocking direction to disengage the latch arm from the catch.

12. The locking system of claim 1, wherein the catch has an angled surface and the first end of the latch arm is configured to ride along the angled surface as the door is moved from the opened position to the closed position such that the latch arm pivots about the first pivot axis due to contact with the angled surface until the first end of the latch arm clears the angled surface.

13. The locking system of claim 1, further comprising a pivot member extending from the latch arm along the first pivot axis, and a mounting bracket fixed to the door, the pivot member pivotally coupling the latch arm to the mounting bracket.

14. A locking system for a fuel compartment assembly of a work vehicle, the locking system comprising:
a housing at least partially defining a fuel access compartment;
a door pivotally coupled to the housing and movable between an opened position, at which the door provides access to the fuel access compartment, and a closed position, at which the door blocks access to the fuel access compartment, the door defining a slot;
a locking assembly configured to lock the door at the closed position relative to the housing, the locking assembly comprising:
a catch fixed to the housing and positioned within an interior of the fuel access compartment; and
a latch arm including a first end positioned within the interior of the fuel access compartment and a second end positioned exterior to the fuel access compartment, the latch arm being pivotably coupled to the door at a pivot point defined between the first and second ends of the latch arm, the latch arm extending through the slot defined in the door such that the latch arm includes an exterior latch portion extending between the slot and the second end of the latch arm, the pivot point defining a pivot axis, the latch arm configured to be pivoted about the pivot axis to selectively engage and disengage the latch arm with the catch,
wherein the exterior latch portion is spaced apart from the pivot axis of the latch arm.

15. The locking system of claim 14, wherein the first end of the latch arm selectively engages and disengages the catch with rotation of the latch arm about the first pivot axis.

16. The locking system of claim 14, further comprising a spring configured to bias the latch arm to rotate about the pivot axis into engagement with the catch.

17. The locking system of claim 14, wherein the catch has an angled surface and the first end of the latch arm is configured to ride along the angled surface as the door is moved from the opened position to the closed position such that the latch arm pivots about the pivot axis due to contact with the angled surface until the first end of the latch arm clears the angled surface.

18. The locking system of claim 17, wherein the first end of the latch arm has an arcuate outer surface configured to ride along the angled surface of the catch as the door is moved from the opened position to the closed position.

19. The locking system of claim 14, further comprising a pivot member extending from the latch arm along the pivot axis, and a mounting bracket fixed to the door, the pivot member pivotally coupling the latch arm to the mounting bracket.

20. The locking system of claim 19, wherein the mounting bracket defines an adjustment slot configured to receive the pivot member, a position of the pivot member within the adjustment slot being adjustable to adjust a position of the latch arm relative to the catch.

* * * * *